United States Patent
Zelek et al.

(10) Patent No.: US 9,705,733 B2
(45) Date of Patent: Jul. 11, 2017

(54) SYSTEMS AND METHODS FOR THROTTLING POLLING

(75) Inventors: Mark C. Zelek, Cary, NC (US); Richard L. Schertz, Raleigh, NC (US)

(73) Assignee: CA, Inc., New York, NY (US)

( * ) Notice: Subject to any disclaimer, the term of this patent is extended or adjusted under 35 U.S.C. 154(b) by 709 days.

(21) Appl. No.: 13/568,924

(22) Filed: Aug. 7, 2012

(65) Prior Publication Data
US 2014/0047000 A1    Feb. 13, 2014

(51) Int. Cl.
*G06F 15/16*    (2006.01)
*H04L 12/24*    (2006.01)
*H04L 12/26*    (2006.01)

(52) U.S. Cl.
CPC ........ *H04L 41/0213* (2013.01); *H04L 43/103* (2013.01)

(58) Field of Classification Search
USPC .......................... 709/217, 219, 227, 228, 250
See application file for complete search history.

(56) References Cited

U.S. PATENT DOCUMENTS 8,194,610 B2 *  6/2012  Tseng ............................. 370/331
8,355,913 B2 *  1/2013  Kiss ............................... 704/235

* cited by examiner

*Primary Examiner* — Viet Vu
(74) *Attorney, Agent, or Firm* — Baker Botts L.L.P.

(57) ABSTRACT

Throttling polling may include sending a request to an agent device and determining whether a response to the sent request is successfully received from the agent device. A result of the determination may be stored in a memory and associated with the agent device. Further, a success rate is calculated for the agent device based on a plurality of the results. A metric related to the sent request and a subsequently sent request is adjusted for the agent device in accordance with an algorithm based on the calculated success rate for the agent device. The metric may be an amount of time between the sent request and a subsequently sent request for the agent device or a number of subsequently sent requests for the agent device.

19 Claims, 4 Drawing Sheets

SYSTEMS AND METHODS FOR THROTTLING POLLING

BACKGROUND

The present disclosure relates to systems and methods for throttling polling to reduce timeouts.

Simple Network Management Protocol (SNMP) uses User Datagram Protocol (UDP) for transport. UDP is a connection-less protocol that allows for packets to be discarded due to buffer overruns. If an SNMP packet is discarded, no response will be received and the SNMP operation will timeout. SNMP timeouts occur as a result of either no connectivity or buffer overruns. Timeouts require retries which further reduces polling performance due to timeout delay, re-submission overhead, network latency, and increased device and network utilization. Avoiding timeouts is critical for high volume polling in network monitoring applications.

BRIEF SUMMARY

According to one aspect of the disclosure, a method comprises sending a request to an agent device and determining whether a response to the sent request is successfully received from the agent device. A result of the determination is stored in a memory and the result is associated with the agent device. Further, a success rate is calculated for the agent device based on a plurality of the results. A metric related to the sent request and a subsequently sent request is adjusted for the agent device based on the calculated success rate for the agent device.

According to another aspect of the disclosure, a system comprises a transmitting device configured to send a request to an agent device and a determining unit configured to determine whether a response to the sent request is successfully received from the agent device. The system may further comprise a memory for storing a result of the determination and associating the result with the agent device. Moreover, the system comprises a success rate calculator configured to calculate a success rate for the agent device based on a plurality of the results and a metric adjusting unit configured to adjust a metric related to the sent request and a subsequently sent request for the agent device based on the success rate for the agent device calculated by the success rate calculator.

According to a further aspect of the disclosure, a computer program product comprises a computer readable storage medium having computer readable program code embodied therewith, and the computer readable program code comprises computer readable program code configured to send a request to an agent device. Further, the computer readable program code is configured to determine whether a response to the sent request is successfully received from the agent device. The computer readable program code also is configured to store a result of the determination in a memory and associate the result with the agent device. Moreover, the computer readable program code is configured to calculate a success rate for the agent device based on a plurality of the results, and to adjust a metric related to the sent request and a subsequently sent request for the agent device based on the calculated success rate for the agent device.

Objects, features, and advantages of aspects of the disclosure will be apparent to persons of ordinary skill in the art from the following description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
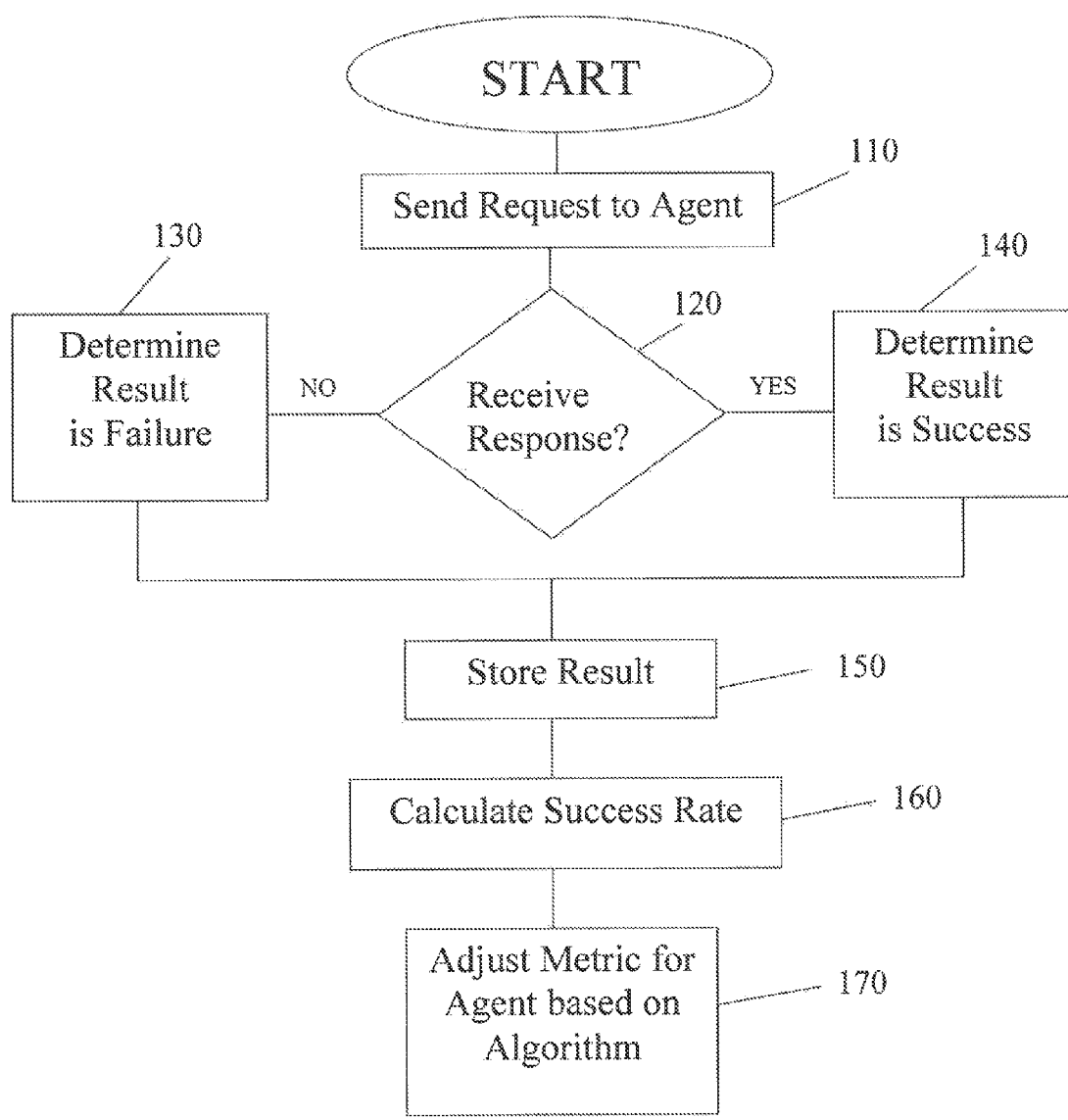
FIG. 1 illustrates a flowchart depicting a process, according to an embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

According to embodiments of the disclosure, an SNMP manager running on advanced hardware can send requests at extremely high rates. However, submitting requests at the highest rate possible may actually reduce performance. A high volume of SNMP requests can overrun UDP buffers anywhere between the requesting SNMP manager and the destination SNMP agents. Controlling the flow of requests to avoid packet loss and resulting timeouts may yield improved polling performance over sending requests at the requester's highest possible rate.

Polling may occur in batches, such that a number of requests sent to a particular agent are awaiting replies. Because the particular agent may wait for a batch to be finished (g, all replies are received), a single failure in the batch may cause all other batches to be delayed. When a request fails for a particular agent, a retry logic may be utilized.

According to embodiments of the disclosure, if a percentage of requests to an SNMP agent succeed, requests that failed may most likely be due to buffer overruns rather than a lack of network connectivity. By logging or tracking success and failure rates for SNMP requests on a SNMP agent basis, the send rate for requests can be adapted to reduce the number of buffer overruns, thereby reducing the number of timeouts. The algorithm to throttle SNMP requests may be based on the success and failure rates. When network topology and device status information is available to the SNMP manager, the algorithm can be enhanced based on this additional information (e.g., scheduled device maintenance, planned outages, statistics for buffer overrun information for each point along the network path to the SNMP agent, or the like, or any combination thereof).

Referring to FIG. 1, a process is depicted for dynamically throttling polling. At S110, a request may be sent to an agent device. At S120, a determination may be made as to whether a response to the sent request has been received. The latency between sending the request and receiving the response may be affected by a number of factors including, for example, the route to the agent, the agent itself, how many entities are polling off the agent, the status of a router or node in the path, or the like. A predetermined amount of time may be set to wait for a response after a request has been sent. The response may include a response code that may indicate a type of response, a status of the agent, information about the agent, or the like, or any combination thereof. If a response has not been received, it may be determined that the result is a failure at S130. If a response has been received, it may be determined that the result is a success at S140. The result, either success or failure, may be stored in a memory and associated with the particular agent, at S150.

Figure 2A:
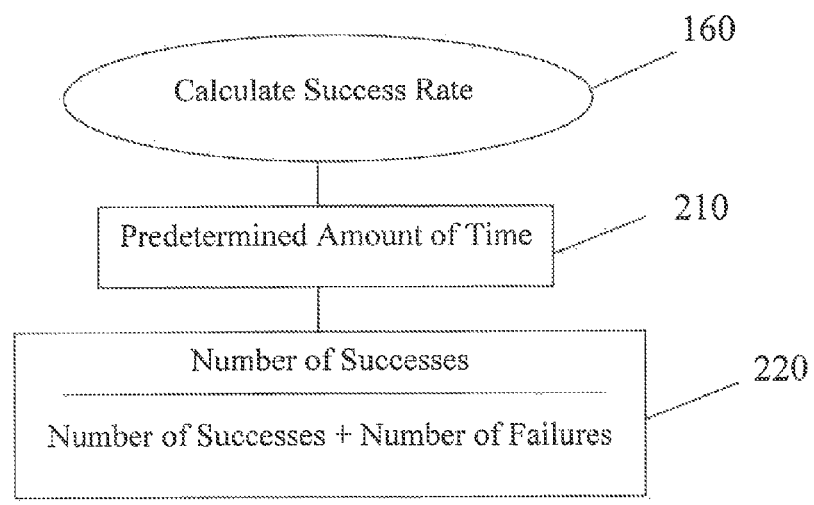
FIG. 2A illustrates a flowchart depicting a process, according to an embodiment.

At S160, a success rate may be calculated for the agent device based on a plurality of the results. The success rate may be calculated in any manner that gives an indication of the rate of success for the agent. For example, the success rate may be a ratio of the number of successes to the number of failures, the ratio of the number of success to the total number of successes and failures (i.e., the total number of requests), or the like. Referring to FIG. 2A, the success rate may be based on a number of successes and a number of failures for a particular agent in a predetermined amount of time at S210. At S220, the success rate may be calculated as the number of successes divided by the sum of the number of successes and the number of failures (i.e., the total number of requests sent).

The success rate may be inputted into an algorithm. The algorithm may be based on the calculated success rate for the agent. At S170, a metric related to the sent request and a subsequently sent request for the agent device may be adjusted based on the algorithm. The subsequently sent request may be a retry request to the agent device when a response is not received from the sent request after a predetermined amount of time. The subsequently sent request may be a next request sent after a timeout for a request or a plurality of requests sent to the agent device.

The algorithm may be based on metrics per agent (i.e., for each particular agent) and may be based on the number of successes and the number of failures in a predetermined amount of time. The predetermined amount of time may be a multiple of the amount of time between the sent request and the subsequently sent request. In other words, the predetermined amount of time may be a factor or multiple of the polling cycle.

Figure 2B:
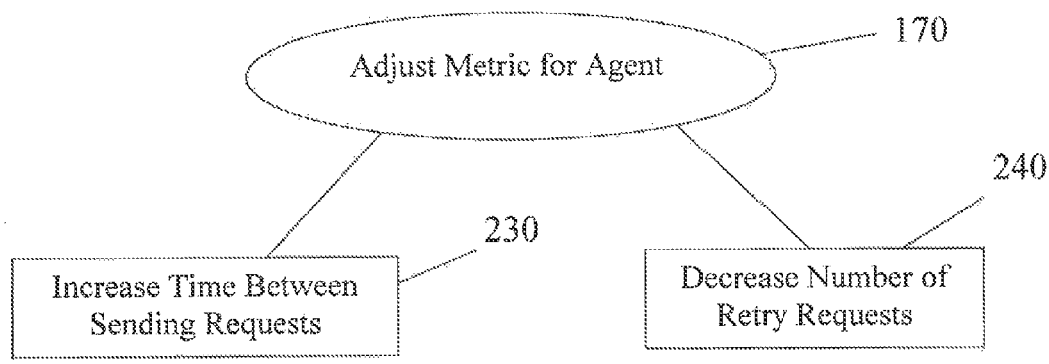
FIG. 2B illustrates a flowchart depicting a process, according to an embodiment.

Referring to FIG. 2B, in S170, the metric related to the sent request and a subsequently sent request for the agent device may be an amount of time between the sent request and a subsequently sent request for the agent device. As S230, this amount of time between the sent request and a subsequently sent request for the agent device may be adjusted by increasing the amount of time between the sent request and the subsequently sent request for the agent device. For example, if the amount of time between the sent request and the subsequently sent request for a particular agent device is initially 0.3 seconds, the amount of time may be increased to 0.5 seconds, in accordance with the algorithm and success rate.

Referring to FIG. 2B, in S170, the metric related to the sent request and a subsequently sent request for the agent device may be a number of subsequently sent requests for the agent device. At S240, the number of subsequently sent requests for the agent device may be adjusted by decreasing the number of subsequently sent requests for the agent device. For example, if the number of subsequently sent requests for a particular agent is initially three, the number may be decreased to one, in accordance with the algorithm and success rate.

The algorithm may be further based on monitoring system data from a network monitoring system. The monitoring system data may add configuration and metric information, in addition to the dynamic retry metrics described above, initialized for each destination agent when first polled. In particular, monitoring system data, for example, for the system for which the polling device is providing data, may be used to augment the polling device. Monitoring system data of configuration and metrics used to augment the dynamic retry metrics may include one or more of: scheduled maintenance for devices (e.g., hosting a SNMP agent), scheduled maintenance for a node along a path between the polling device and destination agent (e.g., switches or routers), and scheduled maintenance for networks.

The algorithm and polling adjustment based on the algorithm may account for this monitoring system data. For example, polling for devices under maintenance may be disabled for the entire schedule maintenance period. Also, for example, devices behind a designated network or node under maintenance (e.g., a critical node or network required to reach the destination agent) may be disabled for the entire schedule maintenance period. Alternatively, for example, polling may continue with the timeout increased and retry requests disabled during a maintenance period. In addition, for example, timeouts may resume before the end of the polling period when responses to requests consistently resume.

Monitoring system data may include buffer overrun statistics associated with SNMP UDP traffic queues for router/switch interfaces. Further, monitoring system data may include baseline metrics such as, for example, CPU, memory, and interface utilization for: devices, nodes along a path to the destination agent, or the like. The algorithm may account for such baseline metrics as well as node or network peak usage, for example, by day of week and time of day. Thus, the algorithm may be structured to take into account that, for example, 10:00 AM to 11:00 AM on Wednesday is known to be a time of peak usage for the device hosting the agent. The above situations are provided only as examples, and it will be apparent to one of ordinary skill that the algorithm may be modified to account for any type of monitoring system data.

According to an embodiment of the disclosure, a computer readable storage medium having computer readable program code embodied therewith may be provided. The computer readable program code may be configured to perform the method or functions outlined above.

Figure 3:
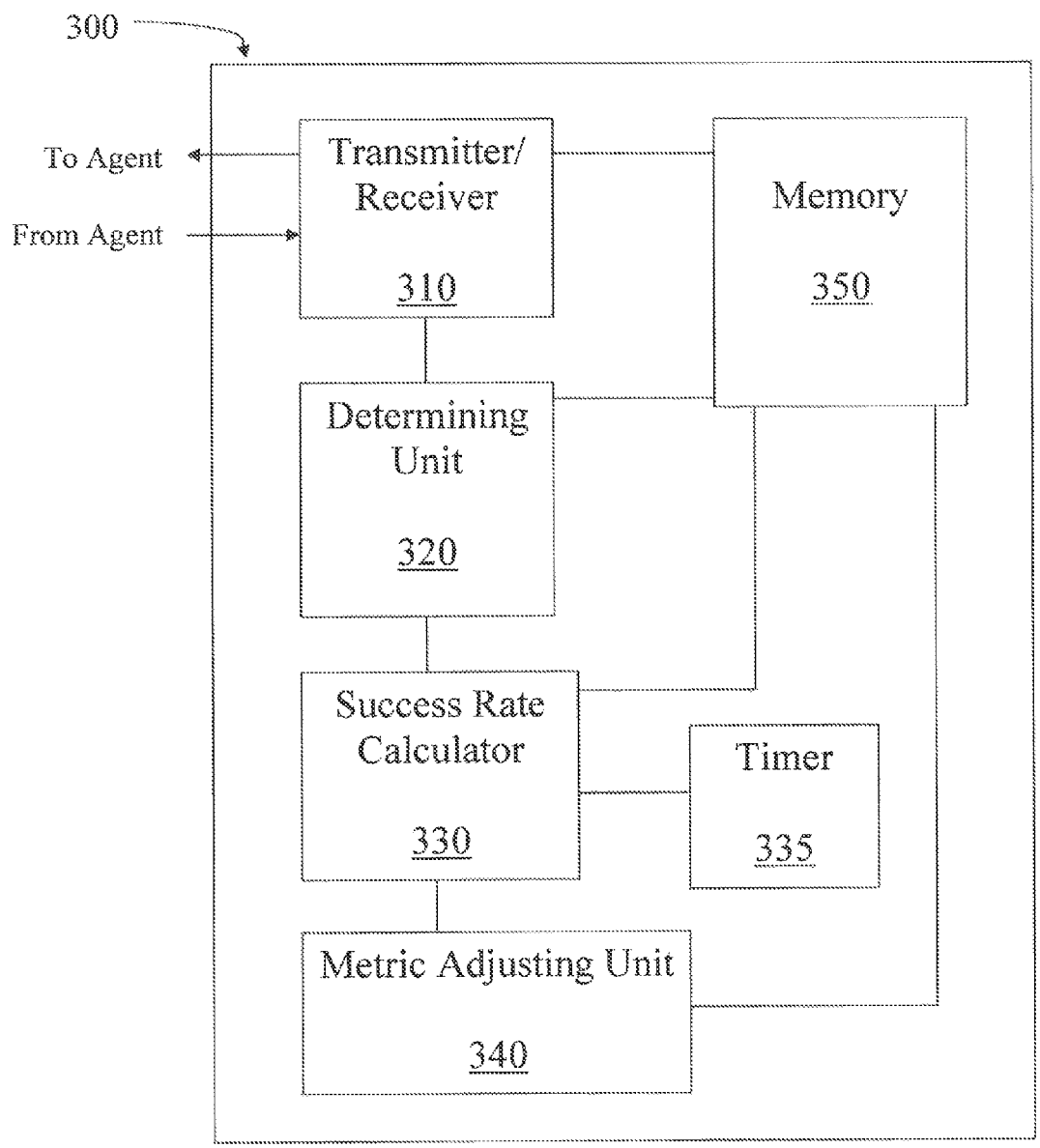
FIG. 3 illustrates a system, according to an embodiment.

Referring to FIG. 3, a system 300 is depicted, according to an embodiment of the disclosure. System 300 may include a transmitting device 310, which may serve as a transmitter and receiver. System 300 may further include a determining unit 320, a success rate calculator, 330, a timer 335, a metric adjusting unit 340, and a memory 350. Transmitting device 310 may be configured to send a request to an agent and to receive a response to the request from the agent. Memory 350 may be configured to store the request and the response in association with the agent to which the request is sent and from which the response is received.

Determining unit 320 may be configured to determine that a result of the request is a success when a response to the sent request is received from the agent device. Determining unit 320 may be further configured to determine that the result of the request is a failure when the response to the sent request is not received from the agent device. The result determined by determining unit 320 may be stored in memory 350 and the result may be associated with the agent device for which the result is determined (i.e., on a per-agent basis). Success rate calculator 330 may be configured to calculate a success rate for the agent device based on a plurality of the results determined by determining unit 320. Metric adjusting unit 340 may be configured to adjust a metric related to the sent request and a subsequently sent request for the agent device based on an algorithm. The algorithm may be based on the success rate for the agent device calculated by success rate calculator 330.

Success rate calculator 330 may be configured to calculate the success rate based on a number of successes, a number of failures, or a combination thereof, determined by determining unit 320 for each agent in a predetermined amount of time. Timer 335 may be used to indicate the predetermined amount of time. The predetermined amount of time may be a multiple of the amount of time between the sent request and the subsequently sent request (e.g., the amount of time for a polling cycle).

The metric adjusted by metric adjusting unit 340 may be an amount of time between the sent request and a subsequently sent request for the agent device. Metric adjusting unit 340 may be configured to adjust the amount of time between the sent request and the subsequently sent request for the agent device by increasing the amount of time between the sent request and the subsequently sent request for the agent device. The metric adjusted by metric adjusting unit 340 may be a number of subsequently sent requests for the agent device. Metric adjusting unit 340 may be configured to adjust the number of subsequently sent requests for the agent device by decreasing the number of subsequently sent requests for the agent device.

The algorithm may be further based on monitoring system data from a network monitoring system. The algorithm and the monitoring system data may be stored in memory 350. The monitoring system data may add configuration and metric information, in addition to the dynamic retry metrics described above, which the algorithm may account for in throttling polling.

Figure 4:
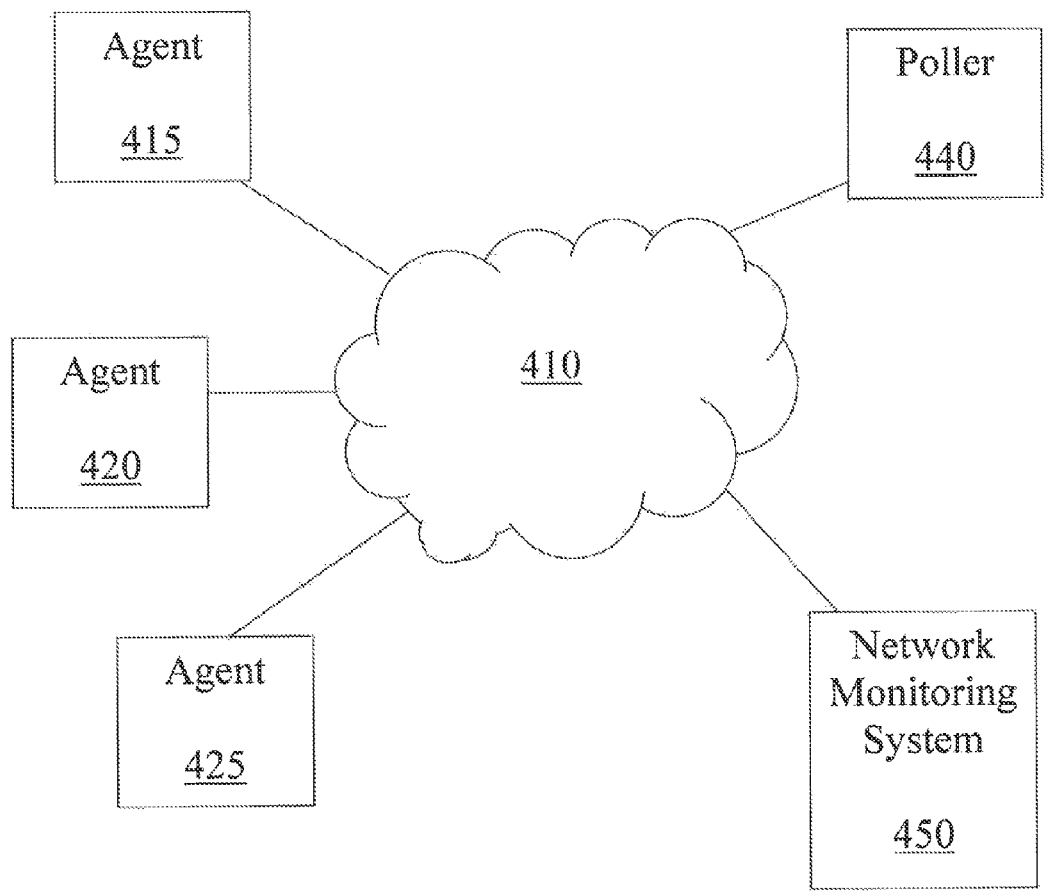
FIG. 4 illustrates a diagram depicting a system, according to an embodiment.

Referring to FIG. 4, a system 400 is depicted, according to an embodiment of the disclosure. System 400 may include a plurality of agents (g agent 415, agent 420, and agent 425), a polling device 440, and a network monitoring system 450. System 400 may include a network 410 through which agents 415, 420, and 425, polling device 440, and network monitoring system 450 communicate. Network 410 may be a cloud computing environment, a wired network, a wireless network, any type of area network (e.g., wide area network, local area network, metropolitan area network, campus area network, storage area network, or the like), or the like, or any combination thereof.

Polling device 440 may send a request to one or more of agents 415, 420, and 425, and may wait a predetermined amount of time to receive a response back from one or more of agents 415, 420, and 425. Based on the rate of successful responses received out of the requests sent, an amount of time between requests sent to a particular agent may be adjusted in accordance with an algorithm. For example, if the success rate for agent 415 is below a predetermined threshold, the amount of time between a request and a subsequent request sent to agent 415 may be increased. Based on the rate of successful responses received out of the requests sent, a number of requests sent to a particular agent may be adjusted in accordance with an algorithm. For example, if the success rate for agent 420 is below a predetermined threshold, the number of requests sent to agent 420 may be decreased.

Network monitoring system 450 may accumulate and provide monitoring system data, such as configuration and metric information, that may be used in the algorithm to throttle polling, in addition to the dynamic retry metrics described above. The monitoring system data from network monitoring system 450 may be initialized for each destination agent when first polled. Network monitoring system 450 may be configured to monitor the same system for which the polling device is applied.

Thus, according to embodiments of the disclosure, a timeout may be dynamically adjusted, using per-agent metrics that the polling device may accumulate while running (e.g., stored in memory) while organizing poll requests sent on a per-agent basis. Further, a polling throttling algorithm may be utilized for the timeout. Retry attempts may be re-queued at the end of the queue and any queued retries may be ceased when the poll cycle completes. Dynamic adjustment may also account for late arriving responses. For failed responses from a particular agent (e.g., no response after the final retry attempt times out), polling may be disabled for that particular agent for the rest of the polling cycle, and retries in future polling cycles may be disabled until a successful reply is received.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    sending a request to an agent device;
    determining whether a response to the sent request is successfully received from the agent device;
    storing a result of the determination in a memory and associating the result with the agent device;
    calculating a success rate for the agent device based on a plurality of the results;
    adjusting a metric related to the sent request and a subsequently sent request for the agent device based on the calculated success rate for the agent device;
    wherein the success rate is calculated based on a number of successfully received responses from the agent device in a predetermined amount of time; and
    wherein adjusting a number of subsequently sent request for the agent device comprises decreasing the number of subsequently sent requests for the agent device.

2. The method of claim 1, wherein the predetermined amount of time is a multiple of the amount of time between the sent request and the subsequently sent request.

3. The method of claim 1, wherein the metric comprises an amount of time between the sent request and a subsequently sent request for the agent device.

4. The method of claim 3, wherein adjusting the amount of time between the sent request and the subsequently sent request for the agent device comprises increasing the amount of time between the sent request and the subsequently sent request for the agent device.

5. The method of claim 1, wherein the metric comprises a number of subsequently sent requests for the agent device.

6. The method of claim 1, wherein the success rate is a component of an algorithm for adjusting the metric related to the sent request and a subsequently sent request for the agent device.

7. The method of claim 6, wherein the algorithm is further based on monitoring system data.

8. A system, comprising:
a transmitting device configured to send a request to an agent device;
a determining unit configured to determine whether a response to the sent request is successfully received from the agent device;
a memory for storing a result of the determination and associating the result with the agent device;
a success rate calculator configured to calculate a success rate for the agent device based on a plurality of the results;
a metric adjusting unit configured to adjust a metric related to the sent request and a subsequently sent request for the agent device based the success rate for the agent device calculated by the success rate calculator;
wherein the success rate calculator is configured to calculate the success rate based on a number of successfully received responses from the agent device in a predetermined amount of time; and
wherein the metric adjusting unit is configured to adjust the number of subsequently sent requests for the agent device by decreasing the number of subsequently sent requests for the agent device.

9. The system of claim 8, wherein the predetermined amount of time is a multiple of the amount of time between the sent request and the subsequently sent request.

10. The system of claim 8, wherein the metric comprises an amount of time between the sent request and a subsequently sent request for the agent device.

11. The system of claim 10, wherein the metric adjusting unit is configured to adjust the amount of time between the sent request and the subsequently sent request for the agent device by increasing the amount of time between the sent request and the subsequently sent request for the agent device.

12. The system of claim 8, wherein the metric comprises a number of subsequently sent requests for the agent device.

13. The system of claim 8, wherein the success rate is a component of an algorithm for adjusting the metric related to the sent request and a subsequently sent request for the agent device.

14. The method of claim 13, wherein the algorithm is further based on monitoring system data.

15. A computer program product comprising:
a computer readable storage medium having computer readable program code embodied therewith, the computer readable program code comprising:
computer readable program code configured to send a request to an agent device;
computer readable program code configured to determine whether a response to the sent request is successfully received from the agent device;
computer readable program code configured to store a result of the determination in a memory and associate the result with the agent device;
computer readable program code configured to calculate a success rate for the agent device based on a plurality of the results;
computer readable program code configured to adjust a metric related to the sent request and a subsequently sent request for the agent device based on the calculated success rate for the agent device;
wherein the success rate is calculated based on a number of successfully received responses from the agent device in a predetermined amount of time; and
wherein the computer readable program code configured to adjust a metric related to the sent request and a subsequently sent request for the agent device is configured to decrease the number of subsequently sent requests for the agent device.

16. The computer program product of claim 15, wherein the metric comprises an amount of time between the sent request and a subsequently sent request for the agent device.

17. The computer program product of claim 16, wherein the computer readable program code configured to adjust a metric related to the sent request and a subsequently sent request for the agent device is configured to increase the amount of time between the sent request and the subsequently sent request for the agent device.

18. The computer program product of claim 15, wherein the metric comprises a number of subsequently sent requests for the agent device.

19. The computer program product of claim 15, wherein the predetermined amount of time is a multiple of the amount of time between the sent request and the subsequently sent request.

* * * * *